455-5 AU 233 EX
ST08102 XR 3,755,737
455/5

United States Patent [19] [11] 3,755,737
Eller [45] Aug. 28, 1973

[54] AGC SYSTEM FOR COMMUNICATIONS SYSTEM

[75] Inventor: Timothy S. Eller, Romulus, N.Y.

[73] Assignee: GTE Sylvania Incorporated, Senaca Falls, N.Y.

[22] Filed: June 26, 1972

[21] Appl. No.: 266,437

[52] U.S. Cl. .......... 325/62, 178/DIG. 13, 179/170.4, 325/308
[51] Int. Cl. .......... H04b 3/10
[58] Field of Search .......... 325/62, 308, 309, 325/404, 405, 407; 178/DIG. 13; 179/15 BP, 170.4; 333/17

[56] References Cited

UNITED STATES PATENTS 3,704,419 11/1972 Rheinfelder .......... 325/308
2,300,415 11/1942 Green .......... 179/15 BP

*Primary Examiner*—Robert L. Griffin
*Assistant Examiner*—Marc E. Bookbinder
*Attorney*—Norman J. O'Malley, Robert E. Walrath et al.

[57] ABSTRACT

An AGC system for a communications system wherein AGC pilot signals originating in separate branches are combined on a single branch is shown. The frequencies of the pilot signals are off-set by a frequency difference sufficient to prevent beat frequencies from deleteriously affecting the gain control of amplifiers responsive to the pilot signals.

6 Claims, 3 Drawing Figures

AGC SYSTEM FOR COMMUNICATIONS SYSTEM

CROSS-REFERENCE TO RELATED APPLICATIONS

D. Lieberman and R. E. Neuber, "Amplifier Station," Ser. No. 130,088, now U.S. Pat. No. 3,717,813 filed Apr. 1, 1971; M. L. Zelenz, "Automatic Gain Control Circuitry and Filter," Ser. No. 263,921, filed June 19, 1972; both assigned to the same assignee as the present invention.

BACKGROUND OF THE INVENTION

This invention relates to automatic gain control (AGC) systems and more particularly to AGC systems of the type used in communication systems such as community antenna television (CATV) systems of the type that use reference or pilot signals. CATV systems of this type are described in the above-referenced copending applications.

In typical CATV systems having AGC the television signals are coupled from a central station called a head-end via a distribution system to a plurality of subscribers. The transmission medium used in the distribution system is typically coaxial cable. Pilot signals are included with the television signals and are used as reference or gain control signals for amplifiers distributed along the cable distribution system. Where the cable is split into two or more paths, the signals including the pilot signals are coupled along the separate paths and can be used as gain control signals for each separate path.

It is often desirable to provide the capability of two-way transmission of signals along the cable. The return signals can include, for example, subscriber communications with a central location such as a studio or the head-end or communications between two or more subscriber locations. In addition, television signals generated within the CATV system such as programming originated at a studio or other location can be coupled via the cable in the return direction to the head-end. Many other and similar uses for two-way signal transmission have been proposed. Typically, CATV systems having two-way signal transmission capability include two amplifiers in each amplifier station along the cable. One amplifier accepts and amplifies the signals in the forward direction which include the television signals being distributed. The return signals are typically in a band of frequencies below the band of frequencies including the VHF television signals. The return signals are accordingly separated from the television signals, e.g., by diplex filters, at each amplifier station and are amplified by return or sub-VHF amplifiers.

It is also desirable to provide AGC for the sub-VHF amplifiers. While some type of prior art AGC system could be used, known techniques suffer from a variety of disadvantages such as lack of accuracy, poor noise response, etc. Such disadvantages are well-known and resulted in the use of pilot signals as reference level signals in the forward direction. In the reverse direction, however, the use of a pilot signal as a reference presents serious disadvantages. For example, consider a system wherein the main trunk line from the head-end is split into two branch trunks. If it is desired to provide AGC for both trunk branches, a pilot generator can be located along or at the extremity of each of the trunk branches. The pilot signals generated by each generator can be used to provide AGC for the trunk branches, however, since the two pilots are combined on the main trunk line, a beat frequency will result. The AGC circuitry can follow such beat frequencies whereby the AGC level varies at the beat frequency thereby modulating the information signals. Thus, known techniques for providing AGC in the return path all suffer from disadvantages which deleteriously affect system operation.

OBJECTS AND SUMMARY OF THE INVENTION

It is a primary object of this invention to obviate the above-noted disadvantages of the prior art.

It is a further object of this invention to provide an AGC system utilizing pilot signals for communication systems.

It is a further object of this invention to provide an AGC system using pilot signals for controlling the gain of amplifiers for amplifying return signals in a CATV system.

In one aspect of this invention the above and other objects and advantages are achieved in an automatic gain control system for a communications system having a plurality of signal generating locations for providing signals to a plurality of transmission mediums which are combined in a single transmission medium. The automatic gain control system includes at least two signal generating means each coupled to respective ones of the transmission mediums for generating a pilot signal. The frequencies of the pilot signals are separated from each other by a frequency difference of at least $\Delta f$. Gain control means associated with or connected to an amplifier in the single transmission medium for controlling the gain thereof in response to at least one of the pilot signals has a frequency response less than $\Delta f$ whereby beat frequencies between the pilot signals do not deleteriously affect the operation of the gain control means.

DETAILED DESCRIPTION OF THE PREFERRED EMBODIMENT

For a better understanding of the present invention, together with other and further objects, advantages and capabilities thereof, reference is made to the following disclosure and appended claims in connection with the above-described drawings.

Figure 1:
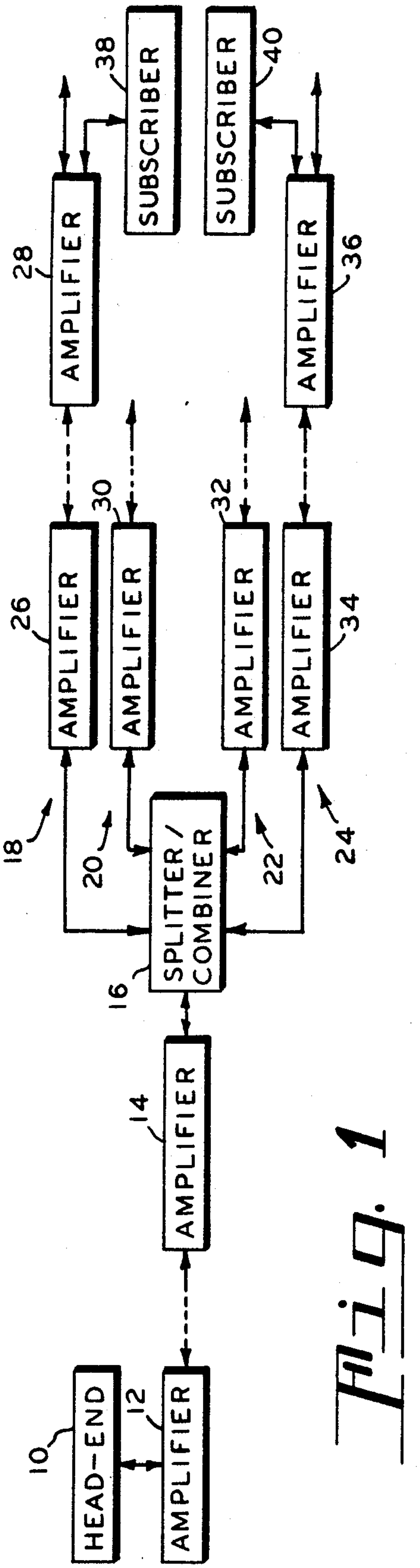
FIG. 1 is a block diagram of a communications system in which the invention finds utility.

FIG. 1 illustrates a generalized communications system of the type typically employed to distribute community antenna television (CATV) signals via a distribution system or network including a transmission medium such as coaxial cable and amplifier stations distributed therealong. While the invention will be described in connection with providing automatic gain control (AGC) for the return signal path for a CATV system, those skilled in the art will realize that the invention can be used in other communication systems as well.

In a typical CATV system, television signals are received by an antenna or other suitable means at a central location or head-end 10 and transmitted therefrom via a coaxial cable distribution system in a band of frequencies including the VHF television band. The branch of the distribution network leading away from head-end 10 is called the trunk line which consists typically of segments of coaxial cable with amplifier stations such as 12 and 14 distributed therealong. The number of amplifier stations, of course, depends primarily on the total length of the trunk line. In some small systems a single trunk line may be sufficient, however, in most systems the main trunk line will be split into two or more branch trunk lines.

In FIG. 1 the output of amplifier 14 is coupled to a splitter/combiner 16. Splitters are a type of signal coupler well-known in the art which couple a signal from one line to a plurality of lines with a fixed loss. Preferably splitter 16 also provides proper impedance matching and isolation between output lines. In FIG. 1, splitter 16 is illustrated as a four-way splitter which splits the trunk line into four branches 18, 20, 22, and 24. Each of the branch trunk lines includes additional amplifier stations therealong such as amplifier stations 26 and 28 along branch 18, amplifier station 30 along branch 20, amplifier station 32 along branch 22, and amplifier stations 34 and 36 along branch 24. Distribution lines tapped off the trunk lines, usually at amplifier stations, distribute the television signals to subscribers such as subscriber locations 38 and 40 coupled to amplifier stations 28 and 36, respectively.

In a bidirectional system, signals for transmission to head-end 10 in the return direction can be generated at remote locations such as subscriber locations 38 and 40. Such signals can be, for example, in a band of frequencies lower than the band of frequencies including the VHF television signals. The various amplifier stations accordingly include sub-VHF amplifiers which amplify the return signals. In the return direction splitter/combiner 16 acts as a combiner to combine the signals on the trunk branches into a composite signal which is transmitted by the single trunk line via amplifiers 12 and 14 to head-end 10.

Assume that it is desired to generate return signals at each of subscriber locations 38 and 40 and to provide AGC for the sub-VHF amplifiers along branch trunk lines 18 and 24. Also assume that each of the pilot signals is 30 mHz. Combiner 16 will combine the two pilot signals along with the remaining signals. Since the two pilot signals are quite close in frequency, they will beat at combiner 16 to provide a low beat frequency which the AGC circuits in amplifiers 12 and 14 will follow or track to provide a fluctuating signal level at the beat frequency. The AGC circuits will, however, have a frequency response or cut-off at some frequency so that higher beat frequencies will not deleteriously affect the AGC circuits.

Figure 2:
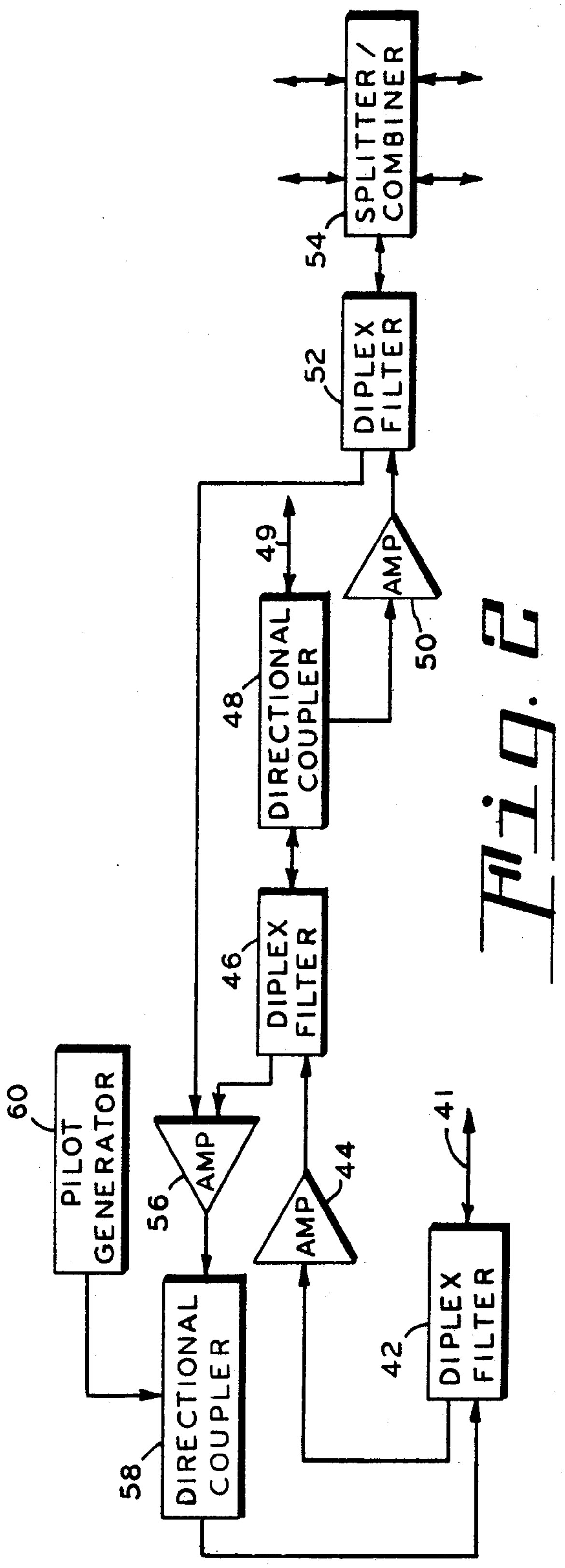
FIG. 2 is a block diagram of an amplifier station incorporating a pilot signal generator.

FIG. 2 illustrates an amplifier station such as amplifier stations 28 and 36 which include signal generating means for generating a pilot signal. Therein a cable segment 41 of branch trunk line 18 or 24 is coupled to a diplex filter 42 which has a high-pass section that passes the VHF signals to a forward trunk amplifier 44. The output of amplifier 44 is coupled via a diplex filter 46 and a directional coupler 48 to an output coaxial cable 49. Directional coupler 48 couples a portion of the VHF signal energy to a bridging amplifier 50. The output of amplifier 50 is coupled via a diplex filter 52 to a splitter/combiner 54 which splits the VHF signals and couples a portion thereof to a plurality of distribution lines.

Return sub-VHF signals are coupled from a plurality of remote locations such as subscriber locations 38 or 40 by combiner 54 to diplex filter 52. Diplex filter 52 couples the return signals via a low-pass portion thereof to an amplifier such as a sub-VHF amplifier 56. Alternatively, or in addition return signals can be coupled from coaxial cable 49 via directional coupler 48 and diplex filter 46 to the input of amplifier 56. The input of amplifier 56 can include a signal combiner to combine signals from the two paths. The output of amplifier 56 is coupled via a directional coupler 58 and diplex filter 42 to coaxial cable 41. A signal generating means 60 for generating a pilot signal has an output coupled to directional coupler 58 which combines the pilot signal with the output signals from amplifier 56. While FIG. 2 illustrates a particular technique for combining a pilot signal with the sub-VHF signals, those skilled in the art will realize that other circuit structure or techniques can be used as well. In general, the pilot signal must be added to the sub-VHF signals in advance of the first gain controlled amplifier.

Figure 3:
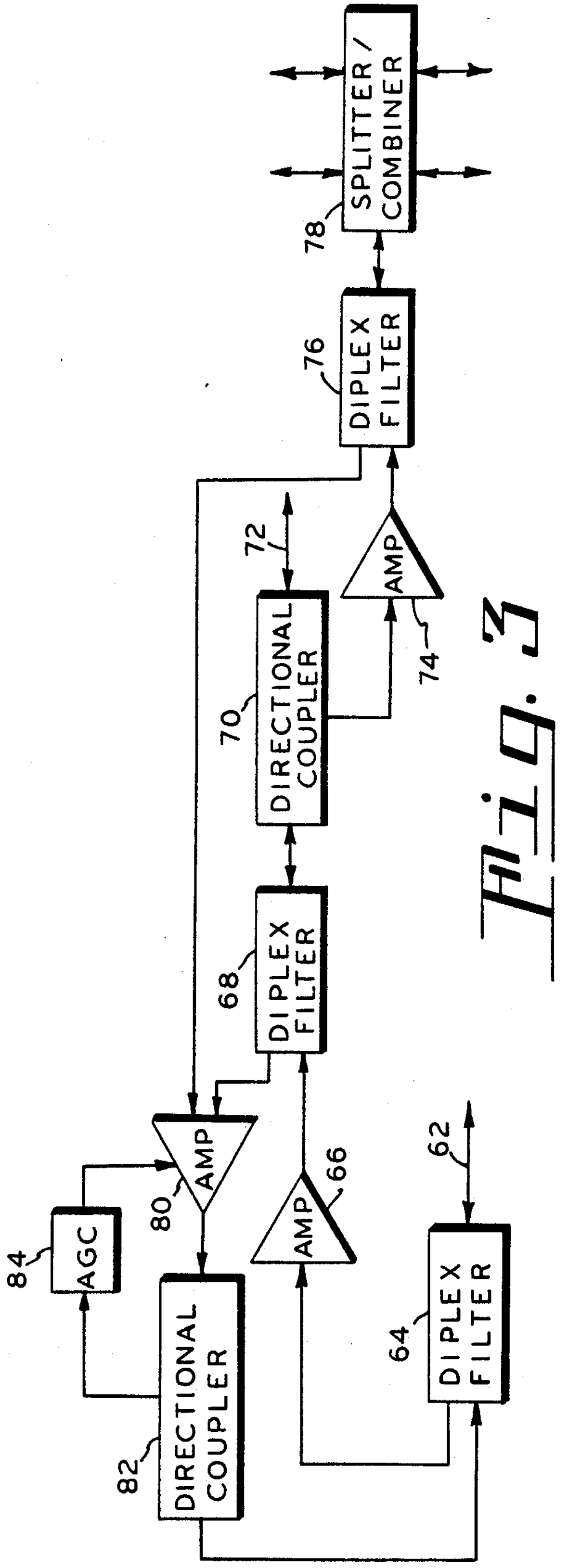
FIG. 3 is a block diagram of an amplifier station utilizing automatic gain control.

FIG. 3 illustrates a preferred form of amplifier station incorporating AGC for the sub-VHF amplifier. Therein a cable segment 62 is coupled to a diplex filter 64 which passes VHF signals to a trunk amplifier 66. An output of trunk amplifier 66 is coupled via a diplex filter 68 and a directional coupler 70 to a cable segment 72. A portion of the VHF signal energy is coupled by directional coupler 70 to a bridging amplifier 74 which has an output coupled via a diplex filter 76 and splitter/combiner 78 to a plurality of distribution lines.

Return signals on coaxial cable 72 are coupled via directional coupler 70 and diplex filter 68 to an amplifier such as a sub-VHF or return amplifier 80. In addition return signals from the distribution lines can be coupled via combiner 78 and diplex filter 76 to an input of amplifier 80. An output of amplifier 80 is coupled via a directional coupler 82 and diplex filter 64 to coaxial cable segment 62. Directional coupler 82 couples a portion of the signals from amplifier 80 including at least the pilot signals to AGC means or circuit 84. AGC circuit 84 develops gain control signals from the amplitude of the pilot signals for application to amplifier 80 to control the gain thereof in response to the amplitude of at least one of the pilot siganls.

In a typical CATV system not all of the amplifiers will incorporate gain control circuitry that utilizes pilot signals. The remaining amplifiers may have a fixed gain or incorporate a type of less accurate gain control. Also, not all amplifier stations will have distribution lines connected thereto. In such amplifier stations directional coupler 70, amplifier 74, diplex filter 76, and splitter/combiner 78 may be deleted.

Assume that on amplifier incorporating AGC such as is illustrated in FIG. 3 is used in amplifier station 14 and that each of branch trunk lines 18, 20, 22, and 24 have return signals including pilot signals. As an example, assume that the lowest frequency pilot signal is $f_o$=30 mHz. Also assume that AGC circuit 84 has a maximum frequency response of $\Delta f$=1 kHz and that the tolerance of the various pilot signal generators is ±1.5 kHz. If the pilot signal with the next lowest frequency is $f_1$=30 mHz plus 5 kHz, then the beat frequency between $f_o$ and $f_1$ will always be greater than 1 kHz or above the frequency response of AGC circuit 84. In general, if each pilot signal is separated in frequency by $\Delta f$ or more from every other pilot signal, all of the beat frequencies will be greater than the frequency response of the AGC circuits.

In systems incorporating only a few pilot signals, however, two beat frequency may also beat with each other to produce a second order beat frequency within the frequency response of the AGC circuits. In such systems, a greater frequency separation between the various pilot signals is preferred. It has been found that if the pilot signals are assigned according to the formula $f_{n+1}=2f_n-f_o+\Delta f$, where $f_{n+1}$ is the frequency of the pilot signal being assigned, $f_n$ is the frequency of the pilot signal next lower in frequency, and $f_o$ is the frequency of the lowest frequency pilot signal, no second order beat frequencies will occur within the frequency response of the AGC circuits and accordingly the AGC circuits will not be deleteriously affected by either first or second order beat frequencies. As a practical matter when a large number of pilot signals are utilized, the second order beat frequencies become increasingly less important and the frequency differences between the various pilot signals can be decreased to $\Delta f$.

While there has been shown and described what is at present considered the preferred embodiment of the invention, it will be obvious to those skilled in the art that various changes and modifications may be made therein without departing from the scope of the invention as defined by the appended claims.

What is claimed is:

1. In a communications system having a plurality of signal generating locations each for providing signals to one of a plurality of transmission mediums each having at least one amplifier therealong, the signals on each of said plurality of transmission mediums being combined in a single transmission medium having at least one amplifier therealong, an automatic gain control system comprising:

first signal generating means coupled to a first one of said plurality of transmission mediums for providing a first pilot signal having a frequency $f_o$;

first gain control means connected to the amplifier of said first one of said plurality of transmission mediums for controlling the gain thereof in response to the amplitude of said first pilot signal;

second signal generating means coupled to a second one of said plurality of transmission mediums for providing a second pilot signal having a frequency $f_1$ greater than $f_o$ by an amount $\Delta f$;

second gain control means connected to the amplifier of said second one of said plurality of transmission mediums for controlling the gain thereof in response to the amplitude of said second pilot signal; and third gain control means connected to the amplifier of said single transmission medium for controlling the gain thereof in response to the amplitude of at least one of said first and second pilot signals, said third gain control means having a frequency response less than $\Delta f$ whereby beat frequencies between said first and second pilot signals do not deleteriously affect the operation of said third gain control means.

2. An automatic gain control system as defined in claim 1 wherein said communications system is a community antenna television system, each of said transmission mediums includes coaxial cable conductors connected between amplifier stations having the capability of amplifying signals carried in either direction on said coaxial cable conductors, and said automatic gain control system operates to control the gain of amplifiers for amplifying signals carried in the return direction.

3. An automatic gain control system as defined in claim 1 wherein a plurality of signal generating means, including said first and second signal generating means, are coupled to respective ones of said plurality of transmission mediums each for generating a pilot signal having a frequency different from any other pilot signal at least by an amount Δi f.

4. An automatic gain control system as defined in claim 3 wherein the frequencies of each of said pilot signals is at least the frequency given by the formula $f_{n+1}=2f_n-f_o+\Delta f$ wherein $f_n$ is the frequency of the pilot signal next lower in frequency.

5. In a community antenna television system for distributing television signals in a first band of frequencies from a central location via a coaxial cable distribution system and having a plurality of remote signal generating locations each for generating signals in a second band of frequencies for transmission along at least a part of said distribution system wherein signals in said second band of frequencies on a plurality of branches of said distribution system are combined in a single branch, an automatic gain control system for controlling the gains of amplifiers for amplifying the signals in said second band of frequencies comprising:

a plurality of signal generating means each coupled to a respective one of the branches for generating a pilot signal of a frequency within said second band of frequencies, the frequency of each of said pilot signals being separated from the frequency of each of the other pilot signals by a frequency difference of at least $\Delta f$; and a plurality of amplifiers each having automatic gain control means responsive to at least one of said pilot signals for controlling the gain of the amplifier, said amplifiers being connected in respective ones of said branches carrying signals in said second band of frequencies and the gain control means associated with each amplifier in a branch carrying signals combined from a plurality of branches having a frequency response less than $\Delta f$ whereby beat frequencies between said pilot signals do not deleteriously affect the operation of the gain control means associated with amplifiers in branches carrying signals combined from a plurality of branches.

6. An automatic gain control system as defined in claim 5 wherein the frequencies of each of said pilot signals is at least the frequency given by the formula $f_{n+1}=2f_n-f_o+\Delta f$ wherein $f_n$ is the frequency of the pilot signal next lower in frequency and $f_o$ is the frequency of the lowest frequency pilot signal.

* * * * *

PO-1050
(5/69)

UNITED STATES PATENT OFFICE
CERTIFICATE OF CORRECTION

Patent No. 3,755,737 Dated August 28, 1973

Inventor(s) Timothy S. Eller

It is certified that error appears in the above-identified patent and that said Letters Patent are hereby corrected as shown below:

Col. 3, line 45 - after "that" - insert "the frequency of"

Col. 5, line 6 - "frequency" should read "frequencies"

Col. 6, Claim 3, line 17 - "$\Delta$i f" should read "$\Delta$f"

Signed and sealed this 26th day of February 1974.

(SEAL)
Attest:

EDWARD M.FLETCHER,JR.
Attesting Officer

C. MARSHALL DANN
Commissioner of Patents

1104